(12) United States Patent
Bailey et al.

(10) Patent No.: US 10,137,652 B2
(45) Date of Patent: Nov. 27, 2018

(54) METHOD OF HOSE CONSTRUCTION

(71) Applicant: Dunlop Oil & Marine Limited, Grimsby, Lincolnshire (GB)

(72) Inventors: Stephen Bailey, Grimsby (GB); Krystian Paskiewicz, Grimsby (GB); Simon Bishop, Grimsby (GB)

(73) Assignee: DUNLOP OIL & MARINE LIMITED, Grimbsy, Lincolnshire (GB)

( * ) Notice: Subject to any disclaimer, the term of this patent is extended or adjusted under 35 U.S.C. 154(b) by 295 days.

(21) Appl. No.: 15/024,869

(22) PCT Filed: Sep. 18, 2014

(86) PCT No.: PCT/GB2014/052840
§ 371 (c)(1),
(2) Date: Mar. 25, 2016

(87) PCT Pub. No.: WO2015/044642
PCT Pub. Date: Apr. 2, 2015

(65) Prior Publication Data
US 2016/0214339 A1     Jul. 28, 2016

(30) Foreign Application Priority Data
Sep. 26, 2013   (GB) .................................. 1317088.1

(51) Int. Cl.
| | | |
|---|---|---|
| B29C 33/46 | (2006.01) | |
| B29D 23/00 | (2006.01) | |
| B29C 37/00 | (2006.01) | |
| B29C 63/00 | (2006.01) | |
| B29C 31/00 | (2006.01) | |
| B29C 33/50 | (2006.01) | |

(52) U.S. Cl.
CPC .......... *B29D 23/00* (2013.01); *B29C 37/0017* (2013.01); *B29C 37/0075* (2013.01); *B29C 31/002* (2013.01); *B29C 33/46* (2013.01); *B29C 33/50* (2013.01); *B29C 37/0067* (2013.01); *B29C 63/0013* (2013.01)

(58) Field of Classification Search
CPC ....... B29C 33/46; B29C 53/824; B29C 63/20; B29L 2023/005
USPC .................................................. 156/173–175
See application file for complete search history.

(56) References Cited

U.S. PATENT DOCUMENTS

| | | | |
|---|---|---|---|
| 2,653,887 A | 9/1953 | Games | |
| 3,519,520 A | 7/1970 | Newman, Jr. | |
| 3,698,988 A | 10/1972 | Skobel | |
| 4,215,459 A * | 8/1980 | Kifor | B29C 31/002 |
| | | | 156/173 |

(Continued)

FOREIGN PATENT DOCUMENTS

| | | |
|---|---|---|
| BE | 772303 A1 | 1/1972 |
| EP | 1396277 A2 | 3/2004 |

(Continued)

*Primary Examiner* — Scott W Dodds
(74) *Attorney, Agent, or Firm* — William J. Clemens; Shumaker, Loop & Kendrick, LLP

(57) ABSTRACT

A method of hose construction comprises: providing a sacrificial layer on the surface of a hose former; constructing a hose on the sacrificial layer; forcing pressurized fluid between the sacrificial layer and the hose former to separate the hose former from the sacrificial layer; and separating the sacrificial layer from the hose.

10 Claims, 4 Drawing Sheets

(56) References Cited

U.S. PATENT DOCUMENTS 4,308,228 A * 12/1981 Kramer, Sr. .......... B29C 31/002
264/286
2005/0230044 A1 10/2005 Berger
2008/0011413 A1 1/2008 Smith et al.
2013/0042478 A1 2/2013 Witz et al.
2013/0139945 A1 * 6/2013 Buerkner .............. B29C 33/505
156/60

FOREIGN PATENT DOCUMENTS

FR 2140295 A1 1/1973
WO WO 2012010134 A2 * 1/2012 ........... B29C 33/505

* cited by examiner

METHOD OF HOSE CONSTRUCTION

FIELD OF THE INVENTION

The present invention relates to a method of hose construction. In particular the invention relates to the final construction stage of removing a rough bore hose, such as a liquid natural gas hose, from a mandrel.

BACKGROUND TO THE INVENTION

The construction of a Liquid Natural Gas (LNG) hose body involves the build up of stacks of multiple non-bonded film and fabric layers as well as internal and external helical wire structures onto a cylindrical mandrel. The internal helical wire structure is the first layer that is built onto the mandrel and it provides the core structural integrity of the LNG hose. The LNG hose is classified as rough-bore hose as a result of this internal helical wire structural characteristic. High frictional forces are generated between the internal helical wire structure and the mandrel over the length of the hose being built as a result of: forces associated with the tension in the wire from the forming of the internal helical wire structure; and load from the build up of the subsequent hose layers. These frictional forces are high enough to restrict the removal of the mandrel by axially pulling the mandrel following the completion of the hose construction as per the standard marine hose de-poling procedure. Using excessive forces to remove the mandrel can potentially result in dislocating the internal helical wire structure and therefore compromising the core structural integrity of the LNG hose.

SUMMARY OF THE INVENTION

The present invention provides a method of hose construction comprising: providing a sacrificial layer on the surface of a hose former; constructing a hose on the sacrificial layer; separating the hose former from the sacrificial layer; and separating the sacrificial layer from the hose.

The sacrificial layer may comprise a solid layer between the hose and the former, preventing the former coming into contact with the hose. The sacrificial layer may be made of rubber.

The hose may define an internal channel and the sacrificial layer and the hose former may be located within the internal channel prior to the separating steps. The hose may be constructed on top of the sacrificial layer.

The method of separating the hose former from the sacrificial layer may comprise forcing pressurised fluid between the sacrificial layer and the hose former. The pressurised fluid may comprise water, air or other liquid lubricants. The sacrificial layer may be impermeable to the pressurised fluid.

The sacrificial layer may form a tube with two openings and the method of separating the sacrificial layer from the hose may comprise sealing the openings of the sacrificial layer to produce a sealed internal volume in the sacrificial layer and reducing the pressure in the sealed internal volume. The sacrificial layer may be impermeable to atmospheric air, preventing atmospheric air entering the sealed internal volume. The sacrificial layer may comprise an end fitting which defines one of the openings and the method of sealing the sacrificial layer may comprise fitting a sealing plate to the end fitting sealing the opening. The end fitting may define one or more channels, for example in its inner surface, to allow fluid to flow between the sacrificial layer and the former.

The method of reducing the pressure in the sealed internal volume may comprise connecting a vacuum pump to the sealed internal volume. The vacuum pump may be connected to the sealed internal volume through a port in the sealing plate. The method of separating the sacrificial layer from the hose may comprise collapsing the sacrificial layer under atmospheric pressure.

The hose may be a liquid natural gas hose.

The method may comprise, in any combination, any one or more features of the preferred embodiments which will now be described by way of example only, and with reference to the accompanying drawings.

DETAILED DESCRIPTION OF THE PREFERRED EMBODIMENTS

Figure 9:
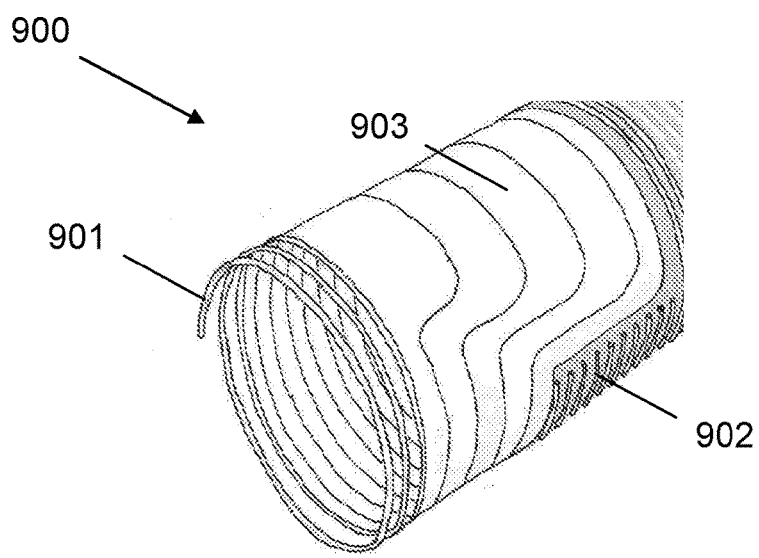
FIG. 9 shows a section view through the wall of a LNG hose formed using the hose construction method of the present invention.

In this embodiment the method of hose construction is applied to a LNG hose. The structure of a completed LNG hose is shown in FIG. 9. The LNG hose has inner 901 and outer 902 helical wire support structures which are supported by layers of non-bonded film and fabric 903.

Figure 1:
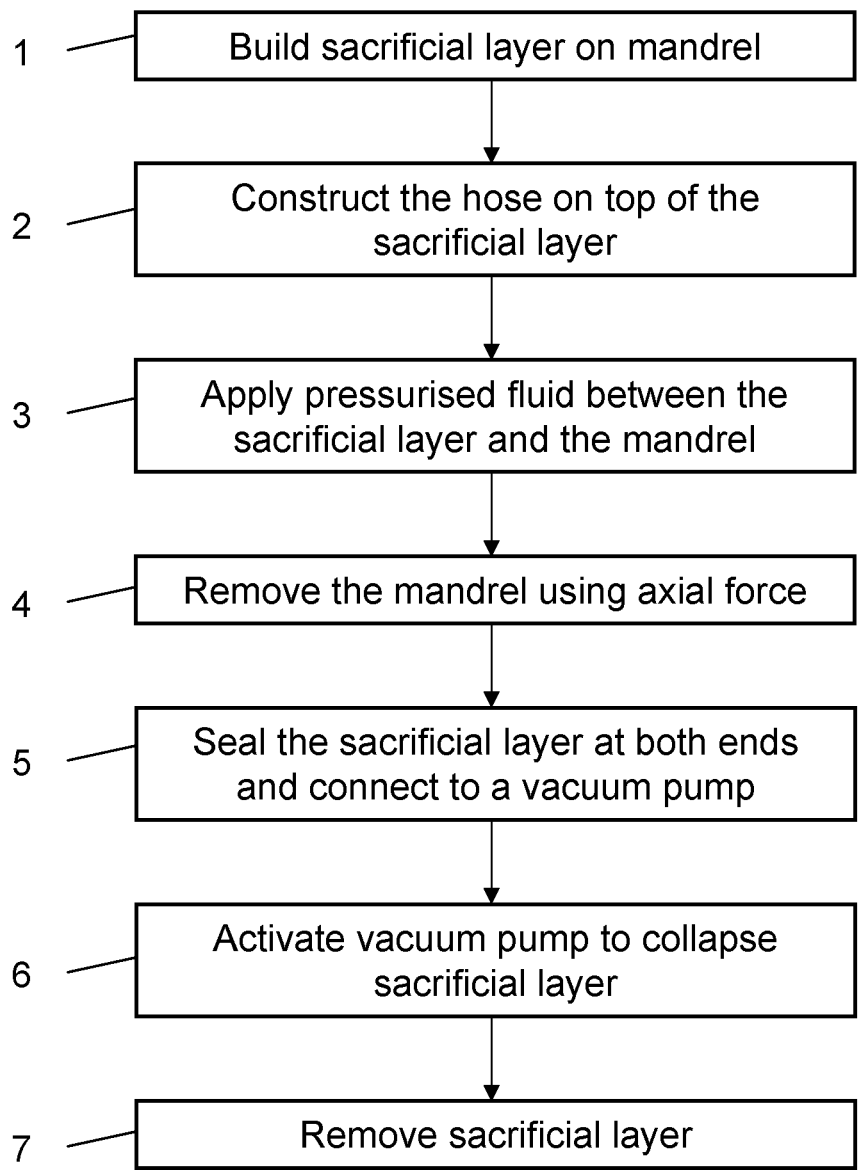
FIG. 1 is a flow diagram of a method of hose construction in accordance with an embodiment of the invention.
Figure 2:
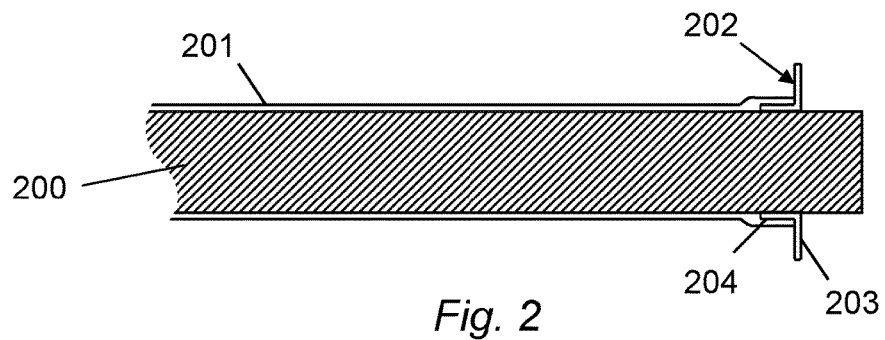
FIG. 2 shows the step of building the sacrificial layer on the mandrel in accordance with an embodiment of the invention.

Referring to FIGS. 1 and 2, step 1 involves applying rubber to a rotating mandrel 200 to build up a sacrificial layer 201 directly on the mandrel surface. Fabric reinforcing layers are also applied to the rubber to provide extra strength to resist stresses primarily in the axial direction during mandrel removal. The sacrificial layer 201 forms a sleeve over the mandrel which is joined and sealed to an end fitting 202. The end fitting 202 has a cylindrical collar 204 and an annular flange 203. The flange is joined to one end of the collar 204 and the collar is sized to slide over the mandrel. The sacrificial layer 201 runs up to and over the collar 204. The sacrificial layer is allowed to cure which bonds the layer to the collar. The cured sacrificial layer 201 provides a base for the hose construction to follow. It is therefore important that the thickness of the sacrificial layer is consistent and the surface finish smooth along the complete length of the mandrel to ensure the bore of the finished hose is consistent as per LNG hose specifications. Although the sacrificial layer has been made from rubber in this embodiment it will be appreciated that other elastomeric materials would also be suitable.

Figure 3:
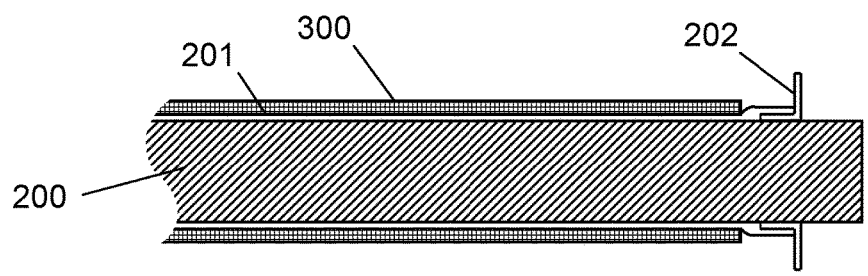
FIG. 3 shows the step of constructing the hose on top of the sacrificial layer in accordance with an embodiment of the invention.

In step 2, the hose carcass 300 is built up on top on the sacrificial layer 201, as shown in FIG. 3. The sacrificial layer prevents the hose from coming into contact with the surface of the mandrel 200. The construction of the hose is carried out in the normal way by coiling internal 901 and external 902 helical wire support structures with stacks of non-bonded film and fabric layers 903 built up in between.

Figure 4:
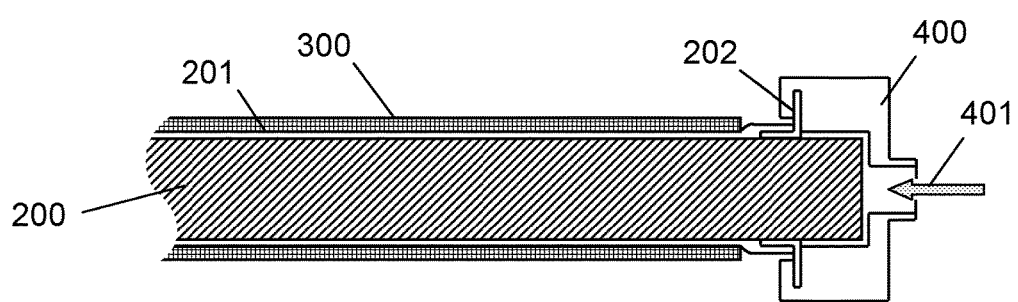
FIG. 4 shows the step of applying pressurised fluid between the sacrificial layer and the mandrel in accordance with an embodiment of the invention.

In step 3, referring to FIG. 4, a hydraulic coupling 400 is bolted to the flange of the end fitting 202. The coupling forms a water tight seal with the flange and directs high pressure water 401 between the sacrificial layer 201 and the surface of the mandrel 200. Machines grooves on the inner surface of the collar 204 of the end fitting direct water on to the surface of the mandrel. Alternatively, the collar may just be sized so that it loosely fits over the mandrel allowing water to pass between the collar and the mandrel surface, so it can flow between the sacrificial layer and the mandrel surface. The high pressure water stretches the sacrificial layer and lifts the sacrificial layer 201 and the hose 300 off the surface of the mandrel 200. It will be appreciated that other pressurised fluids may be used such as compressed air. It is important that the sacrificial layer 201 is impermeable to the pressurised fluid to maintain the pressurised fluid within the sleeve and to prevent fluid permeating through to the LNG hose.

Figure 5:
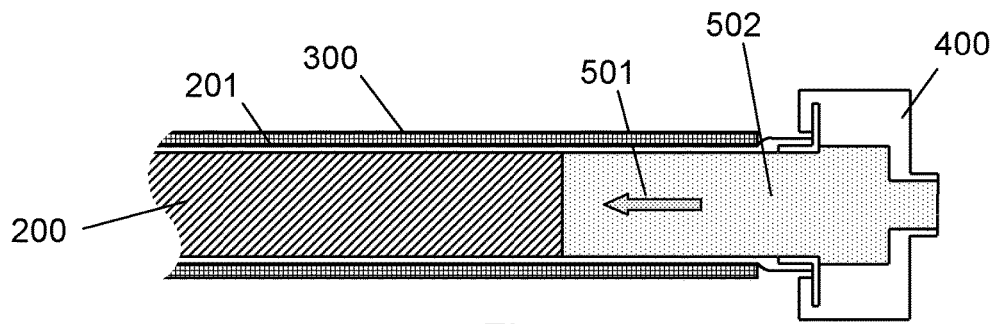
FIG. 5 shows the step of removing the mandrel while applying pressurised fluid between the sacrificial layer and the mandrel in accordance with an embodiment of the invention.

In step 4, referring to FIG. 5, the mandrel 200 is removed using axial force 501 applied to the mandrel while the sacrificial layer 201 and the hose 300 are restrained by the flange of the end fitting 202. The sacrificial layer is put under tension by the axial load, but the sacrificial layer does not stretch under the axial loading because of the fabric layer. High pressure water 502 is continuously supplied during extraction to help hold the sacrificial layer off the surface of the mandrel. The inner surface of the hose 300 and the inner helical wire support structure 901 are protected during this phase by the sacrificial layer which takes all the applied axial load allowing removal of the mandrel without damaging the hose structure.

Figure 6:
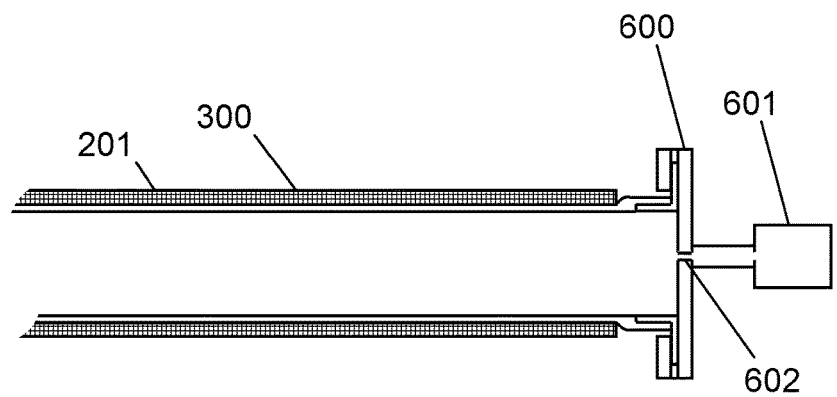
FIG. 6 shows the step of sealing the sacrificial layer at both ends and attaching a vacuum pump in accordance with an embodiment of the invention.

In step 5, referring to FIG. 6, with the mandrel removed the sacrificial layer 201 is sealed at both ends, by fitting a vacuum plate 600 to the end fitting 202 and black vinyl tape is used close and seal the other end which forms an internal sealed volume within the sacrificial layer. The sacrificial layer therefore prevents external atmospheric air from entering the internal volume. The vacuum plate 600 is a solid plate with a seal which abuts the flange of the end fitting 202 sealing the opening in the cylindrical collar 204. The vacuum plate has a port 602 for connecting a vacuum pump. Before a vacuum pump is connected the vacuum plate 600 is fitted to the flange 204 and held in position with clamps. A vacuum pump 601 is connected to the internal sealed volume through the port in the vacuum plate 600.

Figure 7:
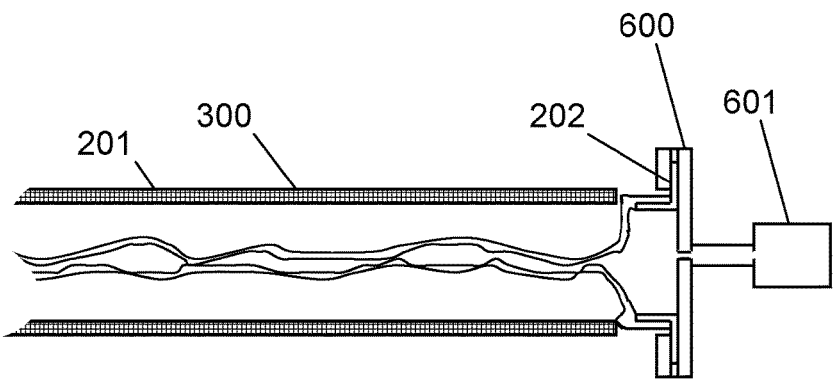
FIG. 7 shows the step of activating the vacuum pump and collapsing the sacrificial layer in accordance with an embodiment of the invention.

In step 6, referring to FIG. 7, the vacuum pump is activated reducing the pressure in the internal volume of the sacrificial layer which collapses under the external atmospheric pressure. As the sacrificial layer collapses it separates from the internal wall of the hose 300. While the sacrificial layer has strength in the axial direction, its thickness should be thin enough to allow it to collapse under vacuum.

Figure 8:
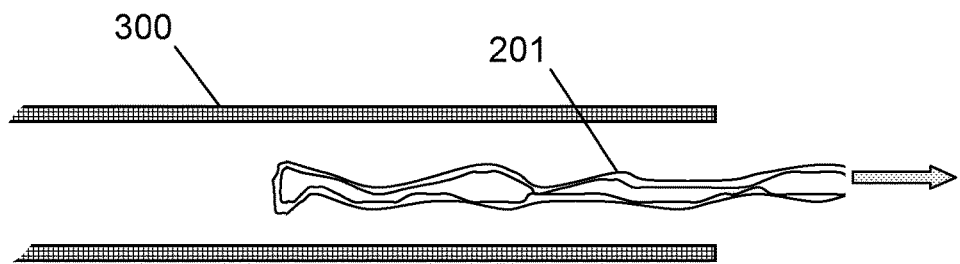
FIG. 8 shows the step of removing the sacrificial layer from the hose in accordance with an embodiment of the invention.

In step 7, referring to FIG. 8, the collapsed sacrificial layer, including the end fitting 202 and vacuum plate 600, can then be easily removed from the bore of the completed hose.

Although this embodiment of the invention has been described in relation to LNG hoses it will be appreciated that the invention may also apply to other types of hose such as standard rubber marine rough bore hoses.

The invention claimed is:

1. A method of hose construction comprising:
   providing a hose former having a surface;
   providing a sacrificial layer on the surface of the hose former;
   constructing a hose on the sacrificial layer;
   forcing pressurized fluid between the sacrificial layer and the hose former to separate the hose former from the sacrificial layer;
   removing the hose former from the sacrificial layer; and
   separating the sacrificial layer from the hose, wherein the sacrificial layer forms a tube with two openings and the step of separating the sacrificial layer from the hose comprises sealing the openings of the sacrificial layer to produce a sealed cavity within the sacrificial layer, the sealed cavity having a pressure therein, and reducing the pressure in the sealed cavity.

2. The method of hose construction according to claim 1 wherein the sacrificial layer comprises a solid layer between the hose and the hose former.

3. The method of hose construction according to claim 1 wherein the sacrificial layer comprises an end fitting which defines one of the openings, and wherein the step of sealing the openings of the sacrificial layer comprises fitting a sealing plate to the end fitting sealing the one of the openings.

4. The method of hose construction according to claim 1 wherein the step of reducing the pressure in the sealed cavity comprises providing a vacuum pump and connecting the vacuum pump to the sealed cavity.

5. The method of hose construction according to claim 1 wherein the sacrificial layer is made of rubber.

6. The method of hose construction according to claim 1 wherein the hose is a liquid natural gas hose.

7. A method of hose construction comprising:
   providing a hose former having a surface;
   providing a sacrificial layer on the surface of the hose former;
   constructing a hose on the sacrificial layer;
   forcing pressurized fluid between the sacrificial layer and the hose former to separate the hose former from the sacrificial layer;
   removing the hose former from the sacrificial layer; and
   separating the sacrificial layer from the hose, wherein the step of separating the sacrificial layer from the hose comprises collapsing the sacrificial layer under atmospheric pressure.

8. The method of hose construction according to claim 7 wherein the sacrificial layer comprises a solid layer between the hose and the hose former.

9. The method of hose construction according to claim 7 wherein the sacrificial layer is made of rubber.

10. The method of hose construction according to claim 7 wherein the hose is a liquid natural gas hose.

* * * * *